United States Patent [19]

McFarlane

[11] 4,053,234

[45] Oct. 11, 1977

[54] THICKNESS MEASUREMENT

[75] Inventor: Ian Duncan McFarlane, Beaconsfield, England

[73] Assignee: United Biscuits Limited, Isleworth, England

[21] Appl. No.: 550,170

[22] Filed: Feb. 18, 1975

[51] Int. Cl.² .................. G01B 11/00; G01N 21/48
[52] U.S. Cl. ................... 356/156; 250/561; 356/199; 356/209
[58] Field of Search ............. 356/156, 157, 199, 200, 356/209; 250/577, 561

[56] References Cited

U.S. PATENT DOCUMENTS

| | | | |
|---|---|---|---|
| 3,187,185 | 6/1965 | Milnes | 356/156 |
| 3,565,531 | 2/1971 | Kane et al. | 356/156 |
| 3,667,846 | 6/1972 | Nater et al. | 356/156 |
| 3,728,715 | 4/1973 | Shapiro | 250/237 G |
| 3,741,656 | 6/1973 | Shapiro | 356/209 |
| 3,782,833 | 1/1974 | Biggs et al. | 356/157 |
| 3,834,819 | 9/1974 | Montone | 356/156 |

*Primary Examiner*—Vincent P. McGraw
*Attorney, Agent, or Firm*—Darbo, Robertson & Vandenburgh

[57] ABSTRACT

For detecting changes of level of a moving surface, a sharply defined light pattern is directed on to the surface and an image of the pattern is formed on a multiple photodiode strip so that a predetermined point of reference of the image is variably located on the strip depending on variation in level of the surface, the photodiode strip is repetitively scanned to create a voltage waveform repetitively defining the variable position of the point of reference on the image in relation to the fixed position of a point of reference on the photodiode strip, and the waveform is analysed to determine the variations in level of the moving surface.

7 Claims, 4 Drawing Figures

Fig. 4.

| | MARK I | MARK II | MARK III |
|---|---|---|---|
| (a) SHARPLY DEFINED LIGHT PATTERN ON MOVING SURFACE. | 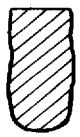 | 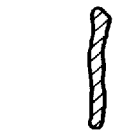 |  |
| (b) IMAGE FORMED ON PHOTODIODE STRIP. |  | 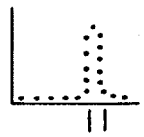 | 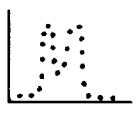 |
| (c) VOLTAGE OBTAINED BY SCANNING PHOTODIODES. | 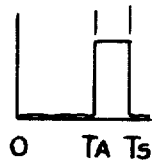 | 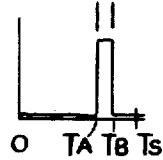 | 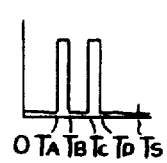 |
| (d) RESULT OF COMPARISON WITH REFERENCE VOLTAGE ($T_S$ = DURATION OF SCAN) | 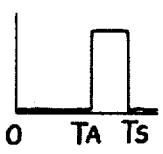 0  $T_A$  $T_S$ | 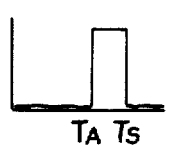 0  $T_A$ $T_B$ $T_S$ | 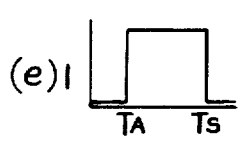 0 $T_A T_B T_C T_D T_S$ |
| (e) OUTPUT FROM FLIP-FLOP CIRCUIT OR CIRCUITS 'SET' AT SOME PRE-DEFINED EVENT ENCOUNTERED DURING SCAN, 'RESET' AT END OF SCAN. | 0  $T_A$  $T_S$ | $T_A$  $T_S$ | (e)1 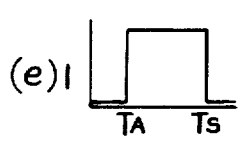 $T_A$  $T_S$ <br>(e)2 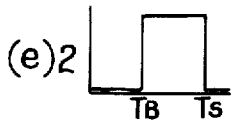 $T_B$  $T_S$ <br>(e)3 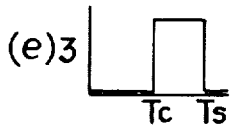 $T_C$  $T_S$ <br>(e)4  $T_D$  $T_S$ |
| (f) ANALOGUE VOLTAGE OR OTHER OUTPUT PROPORTIONAL TO: | $-(T_S - T_A)$ | $(T_S - T_A) - \tfrac{1}{2}(T_B - T_A)$ | $(T_S - T_A) + (T_S - T_B) + (T_S - T_C) + (T_S - T_D)$ |

THICKNESS MEASUREMENT

BACKGROUND AND SUMMARY OF THE INVENTION

This invention relates to location detection devices for monitoring the position of a surface such as a travelling continuous or discontinuous surface. The particular embodiment to be described is for detecting variations in the thickness of biscuits passing along a conveyor.

Systems already known in which contact with a surface is required comprise mechanical gauging by means of wheels, shoes, etc. which are in regular use; while non-contact-making systems in experimental use comprise the electrical capacitance system of Wayne Kerr; the air-jet system of Clayton-Mercer used in steel making; and the new and expensive American Antech system using the laser.

It is also known to project a light beam at an angle on to a surface and to observe the movement of the position of the light spot so formed along the surface due to variation in level and to derive information therefrom.

This technique does not require contact with the surfaces to be examined, and is particularly applicable to use with moving sheets and articles during manufacturing processes.

It can, of course, be used in relation to surfaces in any position from horizontal to vertical; stationary or moving; and for any purpose in which either presence or absence; varying level; or varying thickness is to be monitored.

The present invention is an improvement in this technique utilising a photodiode array as a sequential detector.

DESCRIPTION OF THE DRAWINGS

The invention is described in conjunction with the accompanying drawings wherein:

FIG. 3 shows typical results of successive scans by the photodiode array analysed in a suitable manner, while FIG. 4 shows various alternative ways of applying light patterns to a surface and methods of interpreting the resulting waveforms.

DESCRIPTION OF SPECIFIC EMBODIMENT

The particular problem to which the invention relates is the variation in thickness of moving sheets of dough or biscuits in biscuit manufacture in which the speed of movement is up to 5 meters per second, and the thickness range is 1 - 10 millimeters.

Referring to the above problem, there are commercial advantages in the ability to produce biscuits of uniform weight and density.

Precision of control of weight and density can be enhanced if the thickness of dough sheets, dough pieces, and biscuits can be measured while the dough and the biscuits are in motion. The method to be described for measurement of dough sheet or biscuit thickness has the following advantages believed to occur together for the first time:

a. It is non-contacting, i.e. no part of the device needs to touch the dough sheet or biscuit
b. No moving parts
c. It can respond to changes in thickness extremely fast
d. It is less expensive than existing non-contact making methods none of which has the advantages of this invention.

Figure 1:
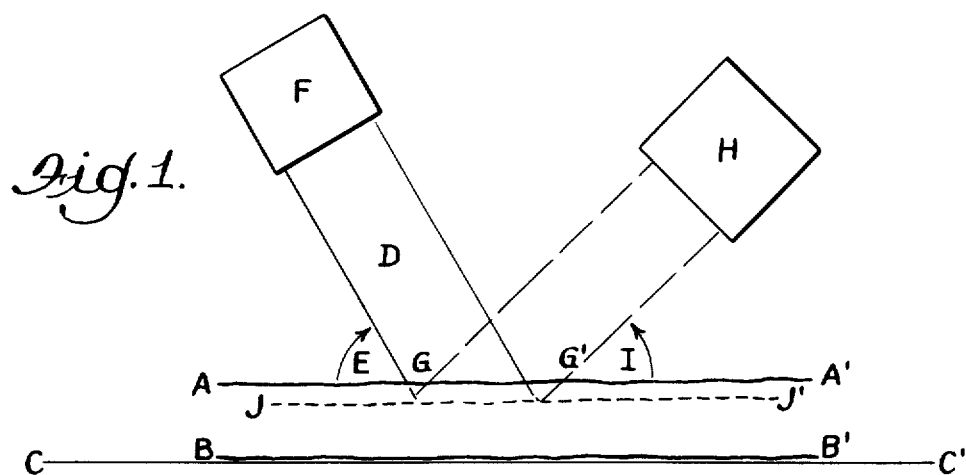
FIGS. 1 and 2 show schematically the principle to be used in detecting changes in level of a surface.

Referring first to FIG. 1 $AA^1$ represents the opaque irregular upper surface of a dough sheet or biscuit whose thickness is to be measured. The other surface $BB^1$ of the dough sheet rests on a fixed plane or supporting face $CC^1$.

A sharply defined beam of light D is projected at an angle E by an optical device F, on to the surface $AA^1$.

A part $GG^1$, of the surface $AA^1$, which part $GG^1$ includes at least part of the area illuminated by the beam of light D, is continuously or very frequently examined by a second optical device H. The light path to H from $GG^1$ is at angle I to the surface being examined.

A change in thickness results in a vertical movement of the illuminated area being examined from $AA^1$ to $JJ^1$. This will cause a longitudinal movement of the position at which beam D impinges on the surface, and also changes the position of the area of the surface examined by device H causing device H to yield a different result.

Device H is so designed that a difference in result therefrom can be unambiguously interpreted as a measurement of the change in thickness. Further, a given result from examination by device H will always correspond to a certain thickness of the dough sheet or biscuit, and the result from device H can therefore be interpreted as measurement of thickness.

Figure 2:
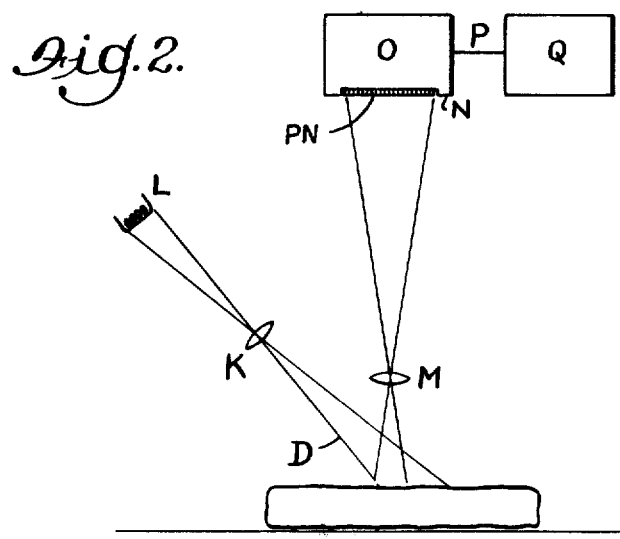

In the more detailed arrangement shown in FIG. 2, the optical device F of FIG. 1 comprises a lamp filament L and a lens K used to form an image of the lamp filament L on the surface of the biscuit being examined. The lamp filament lies at right angles to the optical axis of the lens which makes an angle of 45° with the surface being examined. An image of part of the surface which includes part of the image of the filament is formed by a second lens M of suitable magnification in a plane N. Magnifications 1 and 4 have so far been used. The optical axes of lens M and lens K the plane is vertically coplanar and are perpendicular to the surface being examined and the optical axes of the two lenses are arranged to meet at or near the surface to be examined.

An array PN of photodiodes is placed on the line of intersection of horizontal plane N with the vertical plane containing the two optical axes, so that, at a particular instant, some but not all the photodiodes are illuminated by the image of the bright spot on the surface (which is in turn the image of the lamp filament). Strips of 50 and 128 photodiodes are commercially available and can be used. The 128-PD array is only 0.50 inches long and is part of an electronic scanning device O (a type C7128 camera system available from Integrated Photometrix Ltd. of Dorchester, Dorset, England). Such strips can scan the diode array at an adjustable rate of tens of thousands of scans per second. During each scan the photodiodes are sampled in sequence to produce a composite voltage wave form P, FIG. 3, which contains the instantaneous result of the examination of each diode. This composite voltage signal is passed to an analysing specially-built electronic circuit O which finds the average position over of the first of the diodes of the strip which is illuminated to a predetermined extent in terms of voltage, for instance. This average position can be continuously displayed on a meter and recorded by means of a charge recorder or can be used in any other desired manner. The meter and the recorder can be calibrated in thickness in millimeters. The calibration can be made by noting the reading given by biscuits of known thickness, i.e., a known thickness establishing a datum with respect to which the measurements are made.

Figure 3:
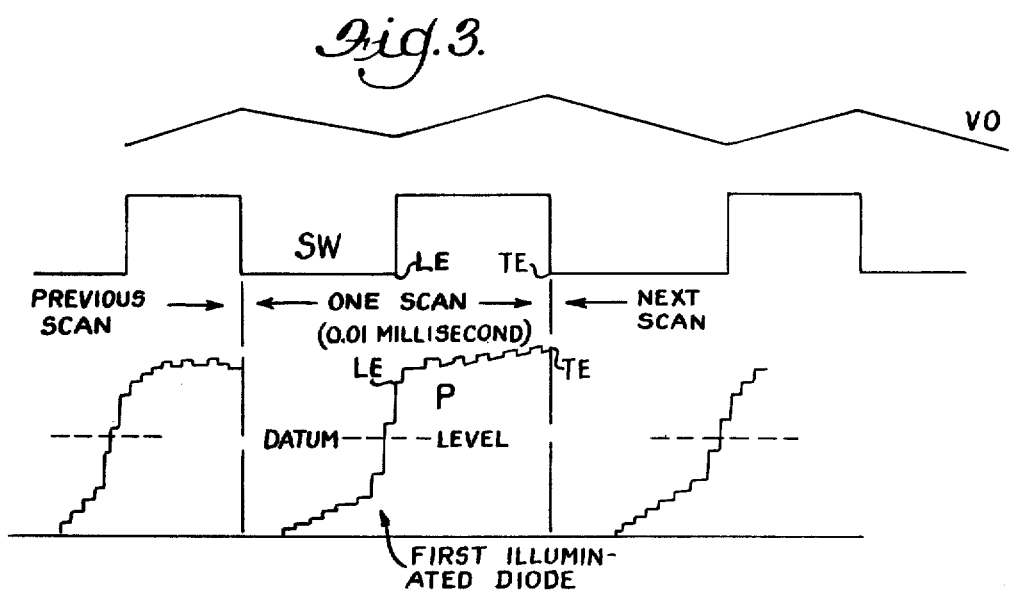

FIG. 3 shows three successive scan wave-forms P produced by the scanning circuit O, each wave form including a voltage level per photodiode. It will be seen that there is a sharp increase in level at the diode on which the leading edge (with reference to the direction of scan of the photodiode strip) of the beam D, FIG. 2, is directed. As the dough surface AA$^1$, FIG. 1, rises and falls, the leading edge of the beam moves to the left and right respectively and it is this movement, in terms of the identity of the photodiode on which the leading edge of the beam is directed at any moment which is the basis of the detection operation by circuit O.

The analysing circuit O of FIG. 2 comprises firstly a continuously-operating level detector designed to produce a continuous square wave SW, FIG. 3, of fixed amplitude but of variable mark/space ratio depending on the position of the datum level, FIG. 3, in each scan. The detector output is triggered as the predetermined voltage level is reached in each scan to form the leading edge LE of a square wave which persists until the end of the scan at which it terminates with the trailing edge TE.

The square wave output from the level detector passes to a smoothing circuit wherein a capacitor is alternately charged and discharged during the 'mark' and 'space' periods of the square wave respectively and creates a voltage output VO, FIG. 3, proportional to the average pulse duration and reflecting the current average position of the leading edges.

The smoothing circuit has a 'sample-held' provision whereby the voltage output is frozen while there is no square wave input when dealing with a file of spaced biscuits, for instance, when the equipment is only interested in the biscuits themselves and the spaces between them are therefore disregarded.

If it is required to follow abrupt changes, the sample-held provision will be omitted and the rate of charge and discharge of the capacitor in response to Mark and Space conditions can be accelerated.

The voltage output can, of course, be interpreted and readings given in any desired terms dependent on the requirement for which the equipment is to be used.

Square wave generators and smoothing circuits suitable for the above purposes are well known and do not need detailed description here.

Many alternative electronic techniques could be used for interpreting the diode scans, FIG. 3, within the scope of the invention, and the location detection devices can be used for a wide variety of purposes.

The embodiment described uses a 12-volt 20-watt tungsten halogen lamp the filament L of which is shown in FIG. 2.

Other possibilities are:
a. The filament of a conventional tungsten lamp
b. Any other light source, including lasers, with a sharply defined outline
c. A slit, or straight edge, or any other sharp outline, illuminated from behind.

Lens K, FIG. 2, is a good quality photographic lens of focal length 75 mm. with its optical axis at 45° to the sample surface AA$^1$. Other possibilities are:
a. A similar system with the optical axis making a different angle with the surface (except that it cannot be perpendicular to the surface if the optical axis of the inspection system is too)
b. A similar system using any combination of lenses and mirrors to produce an image of the source on the sample surface.

The position of the light spot on the surface AA$^1$ is observed by a good quality optical system with X4 magnification to produce an enlarged image of the relevant part of the surface on the photodiode array. The optical axis is perpendicular to the sample surface, but can be at a different angle, providing the angles E and I, FIG. 1, differ adequately.

Other possibilities are:

The optical system may have a different degree of magnification.

In biscuit manufacture, the biscuits are carried horizontally on a moving band, in the normal course of the production process. At the point of measurement, the band is supported by a plane rigidly connected with the measuring device. (The thickness of the moving band is assumed not to vary.) Other possibilities are:
a. The samples could be removed from the moving band, and propelled across a fixed plate (horizontal or inclined) at the point where they pass the measuring head
b. The samples could be brought to some point at which their lower surface would be in a fixed position, relative to the measuring device, at the moment of measurement
c. Two measuring devices could be used to examine both sides of the sample simultaneously, at some point in the production process where both sides are exposed. The total thickness would then be the sum of the measurements from the two devices
d. At a point in the production process where both sides of the sample are exposed, one measuring device could measure the position of both surfaces in a rapidly alternating sequence, by use of mirrors and lenses in a suitable optical arrangement.

The measuring system described above uses a linear array of 50 or 128 photodiodes and a linescan camera system. Any other linescan equipment can be used, and any other optical image analyser, electronic or otherwise.

The purpose-built electronic circuit which effectively gives a continuously varying voltage proportional to the average thickness of the samples over the previous few seconds (and made to ignore gaps between samples), could be replaced by:

A cathode ray tube or other form of display of the output from the linescan equipment with suitable markings to indicate the corresponding thickness; or any form of display of the results of analysis of the optical image of the sample surface by any suitable means; or a digital computer or microprocessor for analysing the waveform P by a sequence of arithmetic operations.

The light pattern used, the reference points on the photodiode strip and the light pattern image thereon, and the method of analysing the waveform derived therefrom, are capable of variations both individually and collectively.

The light pattern can vary in width so that its relation to the length of the strip taking into account also the variation of the position of the image for which the equipment is designed, can vary. A given end of the image should always be intermediate the ends of the strip when the equipment is in use, so that a wide image will tend to overlap the other end of the strip, whereas a narrow image will at all times be wholly included within the length of the strip. The pattern image itself can be continuous, or discontinuous with the length of the strip.

In deriving the waveform from the varying pattern image relation to the strip, reference points fixed in relation to the strip itself and fixed in relation to the current position of the image respectively are used, and each of them can be arbitrarily selected according to requirements of accuracy and the requirements of the particular application and the form in which the results are to be shown or used.

ACHIEVEMENT

FIG. 4 shows three examples of different types of light pattern and the manner of deriving the point of reference on the pattern image.

As indicated in row (a), FIG. 4:

Mark I used a wide continuous pattern which is focussed on to the rear end of the photodiode strip.

Mark II uses a narrow line of light wholly included within the length of the strip; that is within the confines of the scan of the strip.

Mark III consists of narrowly-spaced discrete strips of light.

In all the examples, the reference point feature selected for use on the photodiode strip is its trailing end in the direction of scan.

Row (b), FIG. 4 shows the photodiode strip with the pattern image thereon in each example.

Row (c) shows the voltage obtained from the scanning on the strip with the image superimposed thereon as in Row (b).

Row (d) shows the result of comparison of the voltage shown in Row (c) with a reference voltage in which the trailing edge corresponds to the trailing end of the strip, so that where, as in Mark II, the image is overlapped by the strip, the trailing edge of the pulse is in all cases the trailing end of the strip.

In all cases, the leading edge of the image is $T_A$. In Marks I the trailing edge of the single pulse is $T_D$, in Mark II is $T_B$, while in Mark III, the first pulse is $T_A T_B$ and the second pulse $T_C T_D$, while in all cases $T_S$ is the termination of the scan.

Row (e) shows the derived voltage pulses incorporating the strip reference point $T_S$, so that whereas in Mark I where the image in Row (b) overlapped the trailing end of the strip, the pulses in Rows (d) and (e) are alike; in Mark II the pulse in Row (e) terminates at $T_S$ instead of $T_B$.

For Mark III, as well as the pulse ce)1 covering the whole pattern, other pulses are required for use in deriving the image reference point: these are (e)2 covering TB - TS; (e)3 covering TC - TS; and (e)4 covering TD - TS, using the nomenclature of the Mark III pattern in Row (d).

Row (f), FIG. 4, shows the formulae for deriving analogue voltages defining reference points on the images.

In Mark II the image reference point is the center of the image which is free of the haziness of the edges of the image due to defocussing of the light spot.

Similarly in Mark III, the reference point is derived from the pulses (e)1 - (e)4.

The embodiments of the invention in which an exclusive property or privilege is claimed are defined as follows:

1. In an apparatus for use in measuring the position of a surface in a direction normal to said surface, as said position is related to a datum, wherein a beam of light is projected onto said surface along a first axis with the light reflecting from said surface along a second axis, said axes being in a common plane, the improvement comprising:

a photodiode strip comprising a plurality of photodiodes positioned sequentially along a line, said strip being positioned transverse to said second axis with said line in said plane, whereby a change in the position of said surface in said direction will cause said second axis to move along said line with the result of a change in which of the photodiodes are illuminated by the reflected light; and means connected to said photodiode strip for determining which photodiodes are illuminated to a predetermined degree, said means being arranged to repetitively scan the strip in a given direction to determine the voltage output of each diode in sequence along said line to thereby create a composite voltage signal which is a composite, as related to time, of the voltage output of each photodiode, as related to the direction of scan said beam having a leading edge and a trailing edge, said means connected to said photodiode strip producing a square wave initiated by that part (TA) of the composite voltage signal corresponding to the voltage output of the first diode to be illuminated to said degree and terminated (at TS) by the termination of said scan, the width of said beam between said leading edge and said trailing edge being sufficient to simultaneously illuminate a plurality of said diodes, said means determining which of the diodes, with respect to the direction of scan, is the first to be illuminated to said predetermined degree thereby determining the position of the reflected beam along said line, said means producing a sensible indication of the position of the reflected beam along said line calibrated in terms of the dimension between the part of said one surface at which the axes converge and said datum, said sensible indication being related to the time difference between said signals TA and TS.

2. In an apparatus as set forth in claim 1 and used for measuring the dimension between two surfaces of an object, one of which surfaces is the surface previously referred to, the further improvement comprising:

means for engaging and positioning the other of said surfaces at a given location thereby establishing said datum.

3. In an apparatus as set forth in claim 1, wherein said width is of such a magnitude that said trailing edge is always on said strip.

4. In an apparatus as set forth in claim 1, wherein said width is of such a magnitude that with some positions of the surface said beam is wholly on said strip.

5. In an apparatus as set forth in claim 4, including a second beam also having a leading edge and a trailing edge positioned in said given direction from said strip and with some positions of the surface being wholly on said strip, said means connected to said strip producing, in addition to said first mentioned square wave, three additional square waves each being initiated by a part of said magnitude of said voltage signal occurring by reason of a respective edge subsequent to the first mentioned leading edge and terminated (at TS) by the termination of said scan, said subsequent square wave initiation points being TB — the trailing edge of the first beam TC — the leading edge of the second beam TD — the trailing edge of the second beam
said means having an output corresponding to the time differences in accordance with $$(TS-TA) + (TS-TB) + (TS-TC) + (TS-TD).$$

6. In an apparatus as set forth in claim 1, wherein the beam has a length transverse to said width greater than the dimension in the corresponding direction of the photodiodes of said strip and is positioned so that the photodiodes are intermediate the ends of said length whereby irregularities in said surface will not result in the beam moving transversely even partially off the photodiodes in a direction transverse to said line.

7. In an apparatus for use in measuring the position of a surface in a direction normal to said surface, as said position is related to a datum, wherein a beam of light is projected onto said surface along a first axis with the light reflecting from said surface along a second axis, said axes being in a common plane, said apparatus utilizing a device for forming said beam of light, the improvement comprising:

a photodiode strip comprising a plurality of photodiodes positioned sequentially along a line, said strip being positioned transverse to said second axis with said line in said plane, whereby a change in the position of said surface in said direction will cause said second axis to move along said line with the result of a change in which of the photodiodes are illuminated by the reflected light;

said device being constructed and arranged so that during the course of measuring said surface position the beam of light is wholly within the limits of the length of said strip; and means connected to said photodiode strip for determining which diodes are illuminated to a predetermined degree, thereby indicating the position of said surface with respect to said datum, said means repetitively scanning the strip in a given direction to determine the voltage output of each diode in sequence along said line to thereby create a composite voltage signal which is a composite, as related to time, of the voltage output of each photodiode, as related to the direction of scan said beam having a leading edge and a trailing edge falling within said limits of length, the width of said beam between said leading edge and said trailing edge being sufficient to simultaneously illuminate a plurality of said diodes, said means determining which of the diodes are illuminated to said predetermined degree, determining the median of the diodes illuminated to said degree, and relating said median to a point of reference along the length of the line thereby determining the position of the reflected beam along said line, said means producing a sensible indication of the position of the reflected beam along said line calibrated in terms of the dimension between the part of said one surface at which the axes converge and said datum.

* * * * *